United States Patent [19]
Bigorra Llosas et al.

[11] Patent Number: 5,955,567
[45] Date of Patent: Sep. 21, 1999

[54] METHOD OF PRODUCING CROSS-LINKED CATIONIC POLYMERS

[75] Inventors: Joaquim Bigorra Llosas, Sabadell; Rafael Pi Subirana, Granollers, both of Spain

[73] Assignee: Henkel Kommanditgesellschaft auf Aktien, Duesseldorf, Germany

[21] Appl. No.: 08/952,237

[22] PCT Filed: May 2, 1996

[86] PCT No.: PCT/EP96/01825

§ 371 Date: Jan. 8, 1998

§ 102(e) Date: Jan. 8, 1998

[87] PCT Pub. No.: WO96/35738

PCT Pub. Date: Nov. 14, 1996

[30] Foreign Application Priority Data

May 10, 1995 [DE] Germany .......................... 195 17 047

[51] Int. Cl.$^6$ .......................... C08G 69/08; C08L 77/00
[52] U.S. Cl. .......................... 528/310; 528/322; 523/417; 525/377; 525/416; 524/273
[58] Field of Search .......................... 524/273; 523/417; 525/377, 416; 528/310, 322

[56] References Cited

U.S. PATENT DOCUMENTS

| | | | |
|---|---|---|---|
| 3,215,654 | 11/1965 | Schmalz | 260/17.3 |
| 3,632,559 | 1/1972 | Matter et al. | 260/78 SC |
| 3,914,155 | 10/1975 | Horowitz | 162/167 |
| 3,941,736 | 3/1976 | Aldrich | 524/499 |
| 3,966,654 | 6/1976 | Aldrich | 524/270 |
| 4,017,431 | 4/1977 | Aldrich | 524/276 |
| 4,109,053 | 8/1978 | Aldrich | 428/413 |
| 5,116,887 | 5/1992 | Fischer et al. | 523/400 |
| 5,120,773 | 6/1992 | Fischer et al. | 523/400 |
| 5,239,047 | 8/1993 | Devore et al. | 528/339.3 |
| 5,350,796 | 9/1994 | Devore et al. | 524/514 |
| 5,502,091 | 3/1996 | Dasgupta | 524/55 |
| 5,633,300 | 5/1997 | Dasgupta | 524/55 |

FOREIGN PATENT DOCUMENTS

| | | |
|---|---|---|
| 979 579 | 12/1975 | Canada . |
| 17 95 392 | 1/1972 | European Pat. Off. . |
| 0 549 925 | 7/1993 | European Pat. Off. . |
| 0 553 575 | 8/1993 | European Pat. Off. . |
| 22 39 647 | 2/1973 | Germany . |
| 28 42 713 | 4/1980 | Germany . |
| 865 727 | 4/1961 | United Kingdom . |

Primary Examiner—P. Hampton-Hightower
Attorney, Agent, or Firm—Ernest G. Szoke; Wayne C. Jaeschke; Glenn E. J. Murphy

[57] ABSTRACT

Cross-linked cationic polymers are prepared by alkylating a polyaminoalide with 5 to 30 mole percent, relative to the amount of nitrogen available for alkylation, of a quaternary ammonium alkylating agent and cross-linking the resulting alkylated polyaninoamide with a molar amount of epichlorohydrin corresponding to the non-quaternized nitrogen content. The cross-linked cationic polymers are suitable for use as wet-strength resins in the treatment of paper.

12 Claims, No Drawings

METHOD OF PRODUCING CROSS-LINKED CATIONIC POLYMERS

FIELD OF THE INVENTION

This invention relates to a new process for the production of cross-linked cationic polymers for the treatment of paper and to the use of the crosslinked cationic polymers as wet strength resins.

DISCUSSION OF THE RELATED ART

The generic term "paper" encompasses about 3,000 different types and articles which can differ, in some cases considerably, in their fields of application and their properties. For their production, aqueous 1 to 5% by weight suspensions of cellulose fibers are applied in thin layers to screens on which they are dewatered at high speeds to a solids content of around 40% by weight by application of heat and mechanical pressure. While the still moist raw paper is dried in further steps, the water squeezed off returns to the circuit.

In modern paper mills, it is regarded as important for economic and ecological reasons to keep the water circuit substantially closed. To this end, the process water must of course be free from waste or should only contain waste which is easy to reuse. Particular importance is attributed to the so-called AOX content of the process water, i.e. the content of unwanted halogen compounds.

Unfortunately, the papermaking process unavoidably involves the addition of various additives, including for example fillers, defoamers, dyes, retention agents and auxiliaries which improve the mechanical strength of the paper and which are known as dry or wet strength resins, depending on the field of application. Since the additives accumulate in the process water together with cellulose fibers over a period of time, there is a considerable need for ecologically safe products.

The additives which are regarded as critical in this respect include, in particular, wet strength resins which are crosslinked polyaminoamides. These substances, which are also known commercially as Fibrabones®, are produced from polyaminoamides of which the chains are crosslinked via nitrogen atoms using epichlorohydrin. U.S. Pat. No. 5,116,887, U.S. Pat. No. 5,120,773, U.S. Pat. No. 5,239,047, U.S. Pat. No. 5,350,796 (Henkel Corp.) and European patent application EP-A1 0 553 575 (Hercules) are cited as representative of the extensive prior art available on this subject.

It has been found that there is a direct connection between the degree of crosslinking of the wet strength resins and the improvement in the strength of the paper treated with them. From this point of view, it is advisable to crosslink all the nitrogen groups in the polyaminoamide available for crosslinking through epichlorohydrin units. On the other hand, the reaction of each nitrogen group with epichlorohydrin leads to the elimination of hydrogen chloride (which remains bound as adduct) and, hence, to the presence of AOX in the product which is extremely undesirable for the reasons explained above. Accordingly, attempts have hitherto been made to maintain a balance between the two conflicting parameters (degree of crosslinking and AOX content). In actual fact, however, the results are unsatisfactory because, in many cases, the performance properties are not entirely acceptable, nor is the ecological compatibility of the products by any means adequate.

Accordingly, the problem addressed by the present invention was to provide a process for the production of wet strength resins which would be free from the disadvantages mentioned.

DESCRIPTION OF THE INVENTION

The present invention relates to a process for the production of crosslinked cationic polymers, in which polyaminoamides (a) are first reacted with a quantity of 5 to 30 mole-%, based on the nitrogen available for quaternization, of a quaternizing agent and (b) the resulting quaternized polyaminoamides are then crosslinked with a molar quantity of epichlorohydrin corresponding to the content of non-quaternized nitrogen.

It has surprisingly been found that the performance properties of the crosslinked polyamides can be significantly improved by quaternizing a particular quantity of nitrogen groups in the polymer before crosslinking without the wastewater being additionally polluted with AOX.

Dicarboxylic acids

The polyaminoamides suitable as starting materials for the purposes of the invention are commercial polycondensation products derived from dicarboxylic acids corresponding to formula (I):

$$\text{HOOC—(A)—COOH} \qquad (I)$$

in which A is a linear or branched, aliphatic, cycloaliphatic and/or aromatic, optionally hydroxysubstituted alkylene group containing 1 to 52 carbon atoms and preferably 1 to 10 carbon atoms.

Typical exarmples of dicarboxylic acids from which the polyaminoamides may be derived are, for example, succinic acid, azelaic acid, dodecanedioic acid, phthalic acid and technical dimer or trimer fatty acids. The polyaminoamides are preferably based on adipic acid.

Polyamines

The polyaminoamides suitable as starting materials for the purposes of the invention are commercial polycondensation products additionally derived from polyamines corresponding to formula (II):

$$\text{H}_2\text{N—(B)—NH—((C)NH)}_z\text{H} \qquad (II)$$

in which B and D independently of one another represent linear or branched, optionally hydroxysubstituted alkylene groups containing 1 to 4 carbon atoms and z=0 or a number of 1 to 10.

Typical examples are polyamines corresponding to formula (II) in which B and C represent ethylene groups and z=2 or 3. Accordingly, the preferred polyamines are diethylenetriamine and triethylenetetramine. Overall, polyaminoamides based on adipic acid, and diethylenetriamine are preferred.

Quaternization

Quaternization may be carried out by the method known from the production of conventional cationic surfactants. Suitable quaternizing agents are, for example, alkyl halides corresponding to formula (III):

$$\text{R}^1\text{—Hal} \qquad (III)$$

in which $R^1$ is an alkyl group containing 1 to 4 carbon atoms and Hal represents chlorine or bromine. Typical examples are methyl bromide, butyl chloride and, in particular, methyl chloride.

Other particularly preferred quaternizing agents are dialkyl compounds corresponding to formula (IV):

$$\text{R}^2\text{O—XO}_2\text{—OR}^2 \qquad (IV)$$

in which $R^2$ is an alkyl group containing 1 to 4 carbon atoms and X represents sulfur or phosphorus. Typical examples are diethyl sulfate, dibutyl sulfate, dimethyl phosphate, diethyl phosphate, dibutyl phosphate and, in particular, dimethyl sulfate.

Finally, 2,3-epoxypropyl trimethyl ammonium chloride, 3-chloro or 3-bromo-2-hydroxypropyl trimethyl ammonium chlorides marketed by Degussa AG of Hanau, FRG under the name of QUAB® may also be used as quaternizing agents.

To carry out the quaternization reaction, the polyamidoamines are dissolved in water or alcohol and the quaternizing agent is added in portions to the resulting solution at temperatures of 40 to 70° C. The reaction time is normally 0.5 to 3 h. It has been found to be of advantage to base the quantity of quaternizing agent used (5 to 30 mole-% and preferably 15 to 25 mole-%, based on the nitrogen available for quaternization) on the amine value. The quaternization is preferably carried out with dimethyl sulfate or with a QUAB reagent. In addition, it has proved to be of advantage to adjust the pH value of the intermediate product to 9-11 by addition of an aqueous alkali base after the quaternization reaction.

Crosslinking

The crosslinking of the quaternized polyaminoamides may also be carried out in aqueous or alcoholic solution. It is advisable to add the epichlorohydrin in portions and to carry out the reaction at low temperatures of 10 to 40° C. on account of the considerable heat effect. The quantity of epichlorohydrin to be used normally corresponds to the molar quantity of nitrogen groups available for crosslinking. Accordingly, it is advisable for practical reasons to determine the amine value of the quaternized product once more before the crosslinking reaction. After the epichlorohydrin has been added, the product is stirred for 12 to 48 h and preferably from 24 to 36 h. It is advisable to increase the temperature to around 40° C. towards the end of the reaction and to terminate crosslinking by addition of mineral acid and adjustment of a pH value of 2 to 4 when the viscosity reaches a critical value of around 500 mPa-s (as measured by the Brookfield method, 40° C., spindle 1).

Reaction scheme

The chemical reactions involved are illustrated by the following scheme which relates by way of example to quaternization/crosslinking with dimethyl sulfate (DMS) and epichlorohydrin (EPI):

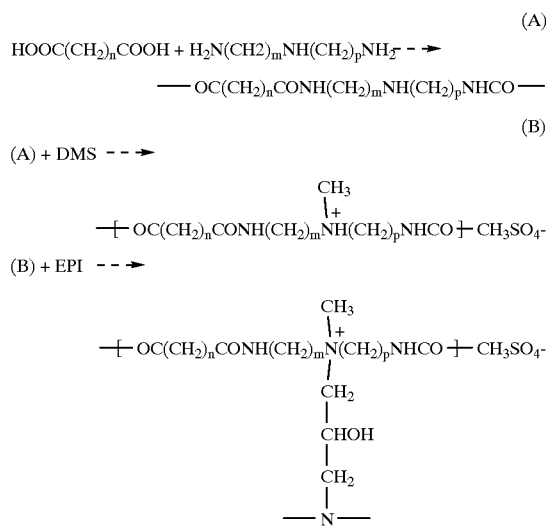

Quaternization may be similarly carried out using alkyl halides, 2,3-epoxypropyl trimethyl ammonium chloride, 3-chloro- and 3-bromo-2-hydroxypropyl trimethyl ammonium chlorides.

Commercial Applications

The crosslinked cationic polymers obtainable by the process according to the invention provide paper with improved strength for low AOX levels. By contrast, known products either show a comparable improvement in strength for higher AOX levels or, conversely, poorer strength for comparable AOX levels.

Accordingly, the present invention also relates to the use of the crosslinked cationic polymers obtainable by the process according to the invention as wet strength resins in papermaking.

The following Examples are intended to illustrate the invention without limiting it in any way.

EXAMPLES

I. Production Examples

Example H1:

Quaternization. In a 1 liter stirred reactor, 450 g of a polyaminoamide based on adipic acid and diethylenetriamine (amine value 101 mg KOH/g corresponding to 0.81 equivalent of nitrogen, a product of Henkel Corp., Gulf Mills/USA) are suspended in 100 ml of water and 44 g (0.2 mole) of 2,3-epoxypropyl trimethyl ammonium chloride (70% by weight in water, QUAB® 151, Degussa AG, Hanau, FRG) were added in portions to the resulting suspension. After the addition, the reaction was heated for 2 h to 60° C. The mixture was then cooled to 17° C. and the pH value was adjusted to 9.5–10 by addition of 50% by weight sodium hydroxide solution. The resulting intermediate had an amine value of 81 mg KOH/g.

Crosslinking. After the addition of another 115 ml of water, 80 g (0.96 mole) of epichlorohydrin were added in portions to the reaction mixture so that the temperature did not exceed 20° C. The reaction mixture was then stirred for 36 h at 30° C. After heating to 40° C., the mixture was stirred until an adequate viscosity of about 500 mPa-s was reached. The reaction was then terminated by addition of aqueous hydrochloric acid and adjustment to pH 2–3. The resulting crosslinked cationic polymer had a dry residue of 13% by weight.

Example H2

Quaternization. As in Example 1, 450 g of the polymer of Example 1 were suspended in 150 ml of water at 40° C. Instead of the QUAB, however, 25.6 g (0.2 mole) of dimethyl sulfate were used for quaternization. After the addition, the reaction mixture was again heated for 2 h to 60° C., cooled to 17° C. and adjusted to a pH of about 9.5 with sodium hydroxide. The amine value was 66.2 mg KOH/g.

Crosslinking. The reaction mixture was diluted with 42 ml of water and 70.7 g (0.76 mole) of epichlorohydrin were added at a temperature of 20 to 35° C. The reaction time was 25 h. The reaction mixture was then heated as in Example 1 up to a viscosity of about 500 mPa-s and adjusted to a pH value of about 2.5 by addition of aqueous hydrochloric acid. The dry residue was 13% by weight.

II. Application Examples

The products according to the invention of Production Examples H1 and H2 and a commercial non-quaternized market product from Hercules Inc. were used in the following in the form of 13% by weight aqueous solutions.

For performance evaluation, an aqueous suspension of 1200 g of cellulose fibers (ratio by weight of long to short fibers =70:30) in 6 liters of water was first prepared. Quantities of 5 and 10% by weight of the test solutions (based on dry matter) were added to quantities of 250 ml of these pastes which were then stirred for 2 minutes and coated onto a substrate. Finally, the still moist raw paper was dried for 30 minutes at 105° C. 15 mm wide strips of paper (weight of the samples about 2 g, paper weight about 55 g/m²) were tested for tensile strength. The results are expressed in Table 1 below as the force required to tear the paper (average of five measurements).

TABLE 1

Determination of Tensile Strength

| Ex. | WSR | Quantity % by weight | Tensile strength N |
|---|---|---|---|
| 1 | H1 | 5 | 5.58 |
| 2 | H1 | 10 | 8.71 |
| 3 | H2 | 5 | 5.22 |
| 4 | H2 | 10 | 7.52 |
| C1 | None | — | 0.21 |
| C2 | Standard | 5 | 4.78 |
| C3 | Standard | 10 | 6.36 |

Legend: WSR = Wet strength resin

We claim:

1. A process for the production of crosslinked cationic olymers, comprising the steps of:
   (a) alkylating a polyaminoamide with 5 mole percent to 30 mole percent, based on the moles of nitrogen in the polyaminoamide available for alkylation, of a compound selected from the group consisting of 2,3-epoxypropyl trimethyl ammonium chloride, 3-chloro-2-hydroxypropyl trimethyl ammonium chloride, and 3-bromo-2-hydroxypropyl trimethyl ammonium chloride to form an alkylated polyaminoamide; and
   (b) crosslinking the alkylated polyaminoamide with a molar quantity of epichlorohydrin corresponding to the moles of non-alkylated nitrogen in the alkylated polyaminoamide.

2. A process according to claim 1, wherein the polyaminoamide is derived from a dicarboxylic acid of the formula (I):

wherein A is a $C_1$ to $C_{52}$ alkylene group that is linear, branched, aliphatic, cycloaliphatic, or aromatic, and that is optionally hydroxy substituted.

3. A process according to claim 2, wherein A is a $C_1$ to $C_{10}$ alkylene group.

4. A process according to claim 2, wherein the dicarboxylic acid is selected from the group consisting of adipic acid, azelaic acid, dodecanedioic acid, phthalic acid, succinic acid, technical dimer fatty acids, and technical trimer fatty acids.

5. A process according to claim 1, wherein the polyaminoamide is derived from a polyamine of the formula (II):

wherein B and D independently are $C_1$ to $C_4$ alkylene groups that are linear or branched and optionally hydroxy substituted, and wherein Z is an integer of 0 to 10.

6. A process according to claim 5, wherein B and C are lene groups and z is 2 or 3.

7. A process according to claim 5, wherein the polyamine is diethylenetriamine or triethylenetetramine.

8. A process according to claim 1, wherein the alkylation step is carried out at a temperature of 40° C. to 70° C.

9. A process according to claim 1, wherein the crosslinking step is carried out a temperature of 10° C. to 40° C.

10. A process for the production of crosslinked cationic polymers, comprising the steps of:
    (a) alkylating a polyaminoamide with 5 mole percent to 30 mole percent, based on the moles of nitrogen in the polyaminoamide available for alkylation, of a compound selected from the group consisting of 2,3-epoxypropyl trimethyl ammonium chloride, 3-chloro-2-hydroxypropyl trimethyl ammonium chloride, and 3-bromo-2-hydroxypropyl trimethyl ammonium chloride to form an alkylated polyaminoamide, said polyaminoamide being derived from a dicarboxylic acid of the formula (I)

wherein A is a $C_1$ to $C_{52}$ alkylene or hydroxy substituted alkylene group that is linear, branched, aliphatic, cycloaliphatic, or aromatic and a polyamine of the formula (II)

wherein B and D independently are $C_1$ to $C_4$ alkylene or hydroxy substituted alkylene that are linear or branched and z is an integer of 0 to 10; and
    (b) crosslinking the alkylated polyaminoamide with a molar quantity of epichlorohydrin corresponding to the moles of non-alkylated nitrogen in the alkylated polyaminoamide.

11. A process according to claim 10, wherein the dicarboxylic acid is a $C_1$ to $C_{10}$ alkylene group, B and C are ethylene groups, and z is 2 or 3.

12. A process according to claim 10, wherein the dicarboxylic acid is selected from the group consisting of adipic acid, azelaic acid, dodecanedioic acid, phthalic acid, succinic acid, technical dimer fatty acids, and technical trimer fatty acids and the polyamine is diethylenetriamine or triethylenetetramine.

* * * * *